(12) United States Patent
Siegman

(10) Patent No.: US 8,134,482 B2
(45) Date of Patent: Mar. 13, 2012

(54) METHOD AND SYSTEM FOR REDUCING MULTIPLE KEYSTROKE OUTPUT

(75) Inventor: Craig Siegman, Pembroke Pines, FL (US)

(73) Assignee: Avocent Corporation, Huntsville, AL (US)

(*) Notice: Subject to any disclaimer, the term of this patent is extended or adjusted under 35 U.S.C. 154(b) by 1043 days.

(21) Appl. No.: 11/987,605

(22) Filed: Dec. 3, 2007

(65) Prior Publication Data

US 2009/0144468 A1    Jun. 4, 2009

(51) Int. Cl.
*H03M 11/00* (2006.01)

(52) U.S. Cl. .............. 341/22; 709/220; 341/20; 710/1; 710/5; 710/73

(58) Field of Classification Search .......... 341/20–35
See application file for complete search history.

(56) References Cited

U.S. PATENT DOCUMENTS

| 2007/0038731 A1* | 2/2007 | Matsunaga et al. ........... 709/220 |
| 2008/0040522 A1* | 2/2008 | Matthews ...................... 710/107 |
| 2008/0077660 A1* | 3/2008 | Tomida ......................... 709/203 |

* cited by examiner

*Primary Examiner* — Timothy Edwards, Jr.
*Assistant Examiner* — Franklin Balseca
(74) *Attorney, Agent, or Firm* — Davidson, Berquist, Jackson & Gowdey, LLP

(57) ABSTRACT

A method for reducing the erroneous display of multiple keystrokes on a target computer, that occur when depressing a key a single time on a Universal Serial Bus (USB) based keyboard from a remote computer. The invention eliminates the time lapse between the key press and key released events to produce single keystrokes on the target computer, instead of erroneous multiple keystrokes.

19 Claims, 4 Drawing Sheets

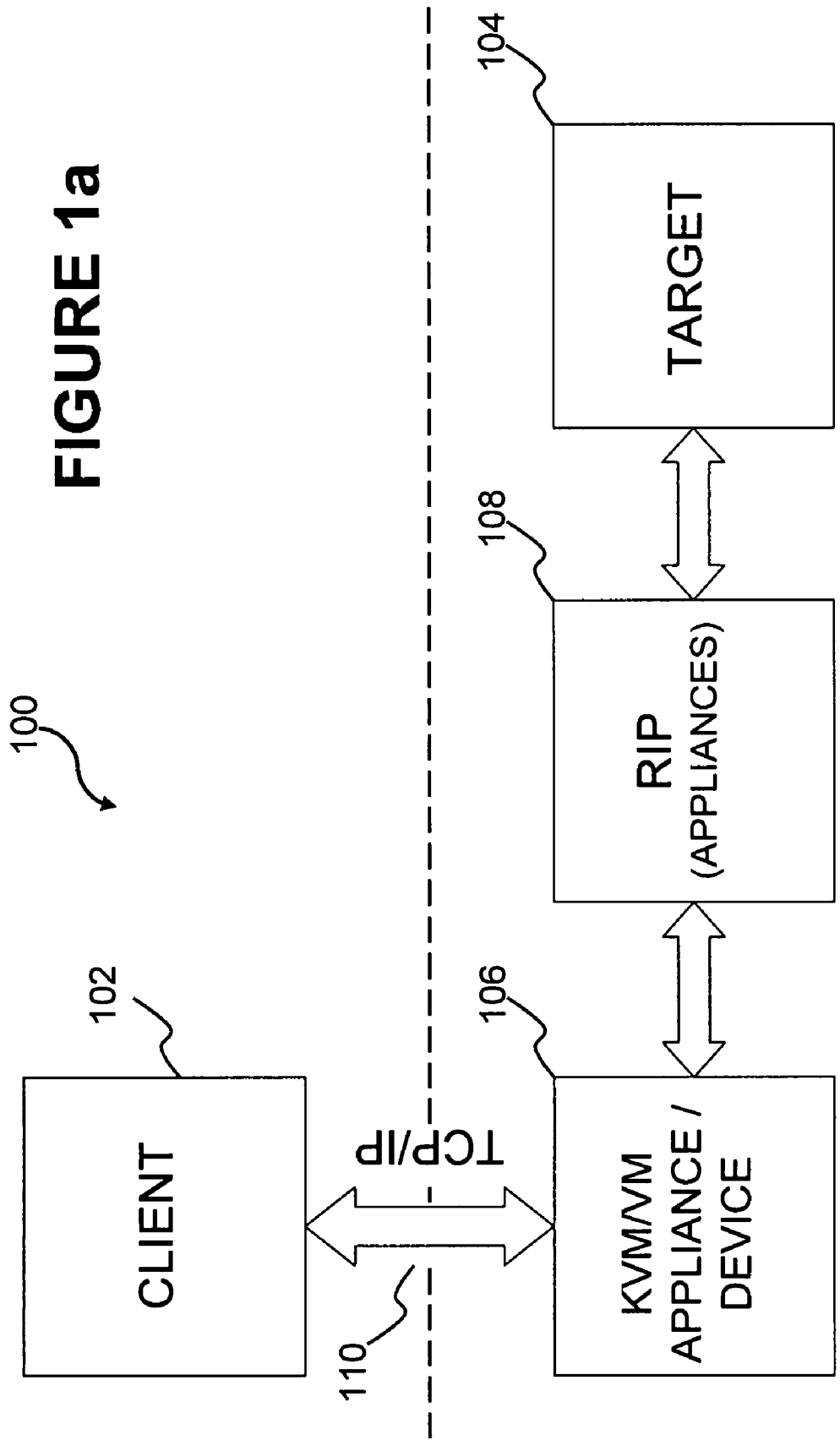

METHOD AND SYSTEM FOR REDUCING MULTIPLE KEYSTROKE OUTPUT

FIELD OF THE INVENTION

The present invention relates to a method for reducing multiple keystroke entries that are erroneously displayed on a target device when depressing a key a single time on a Universal Serial Bus (USB) based keyboard that is virtually connected to the target device.

INTRODUCTION

KVM (keyboard, video, and mouse) systems that provide remote access to so-called target computers are well known. In such systems, one or more so-called KVM switches, are used to selectively connect remote (client) computers to the keyboard, video and mouse ports of target computers. In this manner, a remote computer can access and control operation of a target computer.

A connection between a client and a KVM switch may be via direct connection (e.g., CAT-5 cable), or it may be over network such as an Ethernet-based network or a TCP/IP network or the like.

FIG. 1a shows an exemplary architecture of a system/framework 100. As illustrated, a client (computer) 102 can connect to a target (computer/server) 104 via a KVM/VM device (appliance) 106 and an optional connection device such as a RIP (Rack Interface Pod) 108. An exemplary RIP is described in U.S. patent application Ser. No. 09/951,774, filed Sep. 14, 2001, titled "Passive Video Multiplexing Method And Apparatus," the entire contents of which are incorporated herein by reference. The client 102 connects to the KVM device 106 via a network 110 such as, e.g., a TCP/IP network.

Those skilled in the art will realize, upon reading this description, that while only one client and one target are shown in FIG. 1a, a typical framework 100 according to embodiments of the present invention may include a number of clients, targets and appliances, connected in various ways.

As is also well known in the art, the Universal Serial Bus ("USB") protocol has timing requirements and constraints that impose limits on the distance between USB devices and processors connected thereto. Aspects of USB communication transactions are described in U.S. patent application Ser. No. 11/294,563, filed Dec. 6, 2005, titled "Universal Serial Bus (USB) Extension," the entire contents of which are incorporated herein by reference.

Because USB keyboard processing in remote systems is similarly affected by the timing requirements and constraints mentioned above, sometimes problems occur when entries are made using a USB connected keyboard from a remote computer. Sometimes when a single keystroke is entered by the user at a remote computer, multiple keystrokes of the same character are displayed on the target computer. The problem occurs because USB keyboard processing in the target is time-based, and anything that disturbs the expected timing can cause the identified problem. For example, network delays may cause keystroke events sent to the target from the remote computer to not arrive in a timely manner. If they do not, then multiple keystrokes on the target may occur, even though the user intended only a single keystroke to occur.

Other attempts at solving the identified multiple keystroke problem have involved changing keyboard settings on the target computer so that the typematic delay time is set to a large value, and the keyboard repeat rate is set to a low value. This solution is only effective when the operating system (OS) is running on the target. When the target computer is in a state where the OS is not running, for example during boot-up, OS install, or BIOS configuration, the typematic settings are not effective, and the multiple keystroke problem can occur on a regular basis.

SUMMARY OF THE INVENTION

Circuitry may be embedded in a RIP or embedded in a server that eliminates the time lapse between a key pressed event and a key released event by not acting on the key pressed event until the circuitry knows what the next event is. The next event could be either another key press or a key release. If the next event is a key release, then the circuitry first processes the key pressed event and then the key released event. If the next event is a key press, then the circuitry processes the pending key press event and marks the current event as the pending key event. Thus, the key press and key release events are processed in a timely manner that, for single keystrokes, eliminating possible delays that occurred in transmitting the events from the remote console to the KVM solution.

BRIEF DESCRIPTION OF THE DRAWINGS

The invention is better understood by reading the following detailed description with reference to the accompanying drawings in which:

FIG. 1a shows a known environment using a KVM appliance.

DETAILED DESCRIPTION OF THE INVENTION

Figure 1B:
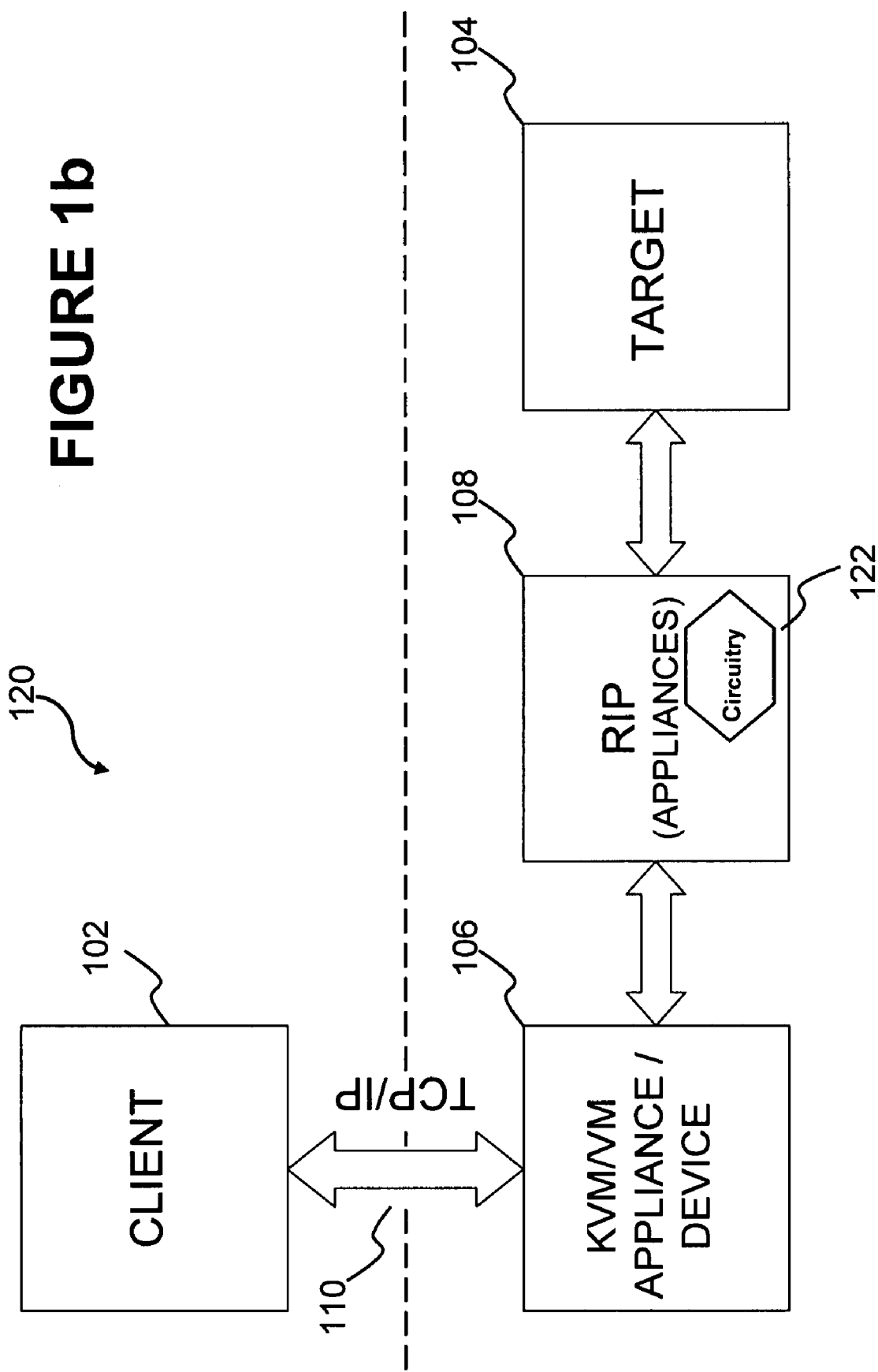
FIG. 1b, and 1c show the architecture of a system/framework according to described embodiments.

Referring to FIG. 1b, the target computer 104 connects to the KVM/VM appliance 106, either directly, or using a RIP 108. In the case when a RIP 108 is used, the RIP cables are preferably connected to a USB port of the target, and so the RIP and target communicate using the USB protocol, preferably USB 2.0. The target computer 104 may connect directly to the KVM/VM appliance 106, in which case the target and appliance communicate using the USB protocol via a connection to a USB port of the target. In those cases, where no separate RIP is used, necessary functionality of the RIP may be incorporated into the KVM/VM appliance 106. Finally, the target computer/server 104 may be any computer, including, without limitation, a server in a server rack or a blade-based server, and it may run any operating system (OS).

The invention reduces the multiple keystroke problem by eliminating the time lapse between the keystroke pressed event and the keystroke released event, for single keystrokes. The invention also has the added advantage of being effective regardless of whether the OS on the target is running or not. It also eliminates the need for user intervention in changing the keyboard settings on the target.

Figure 1C:
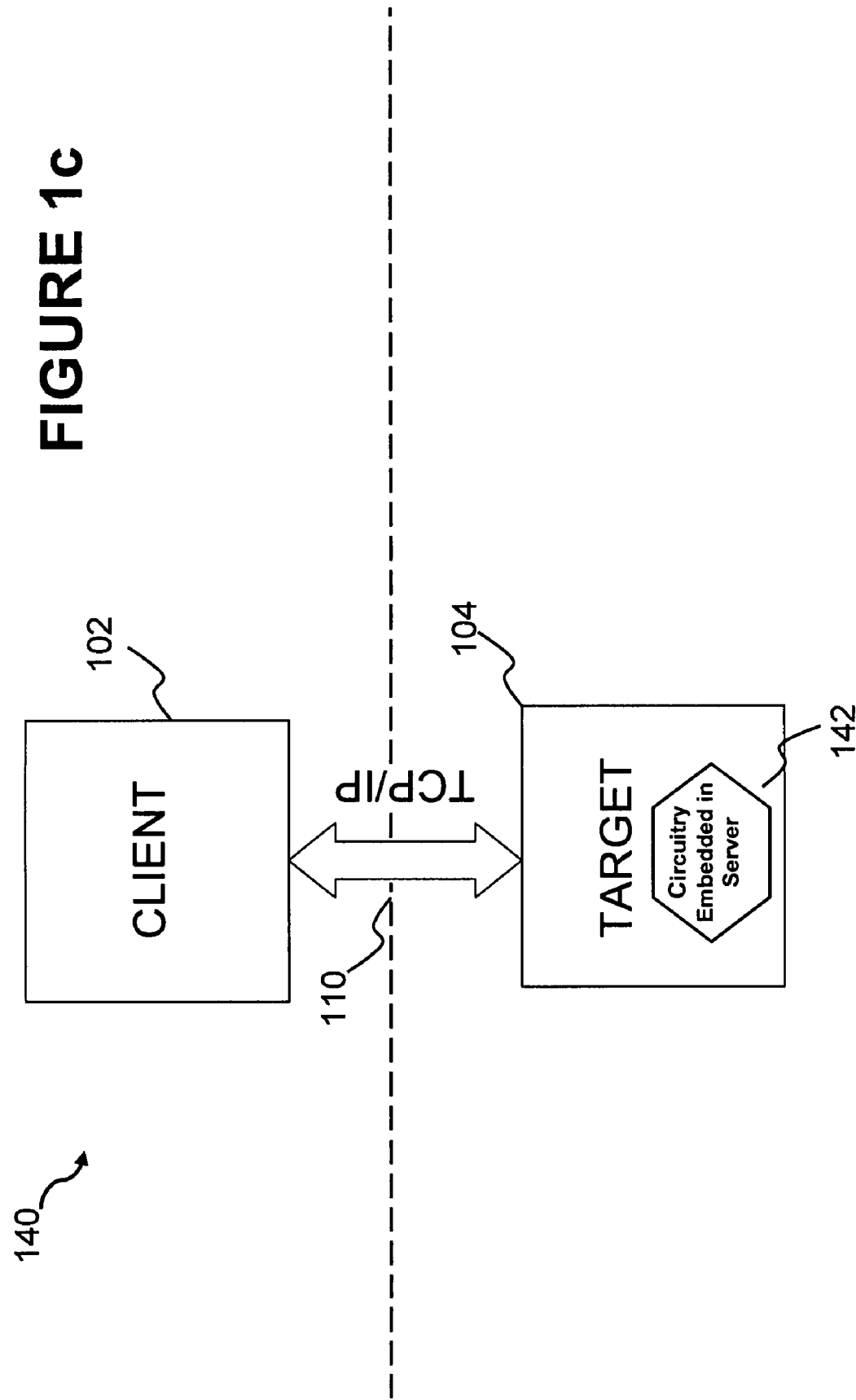

The invention employs circuitry that may be embedded in the RIP, or embedded in a server 142, such as a blade-based server, located at the target computer 104. FIG. 1b is an exemplary depiction of the circuitry 122 being embedded in the RIP 108. FIG. 1c is an exemplary depiction of the circuitry being embedded in a server 142, such as a blade-based server, located at the target computer 104. The invention eliminates the time lapse between the key pressed event and the key released event by not acting on the key pressed event until it knows what the next event is. The next event could be either another key press, or a key release. In order to accomplish this, the circuitry in the KVM solution (either in a RIP or embedded in a server, such as a blade-based server) delays processing of the key pressed event until it receives another event. If the next event is a key release, then the circuitry first processes the key pressed event and then the key released event. If the next event is a key press, then the circuitry processes the pending key press event and marks the current event as the pending key event. In this way the key press and key release events are processed in a timely manner that, for single keystrokes, eliminates possible delays that occurred in transmitting the events from the remote console to the KVM solution.

Figure 2:
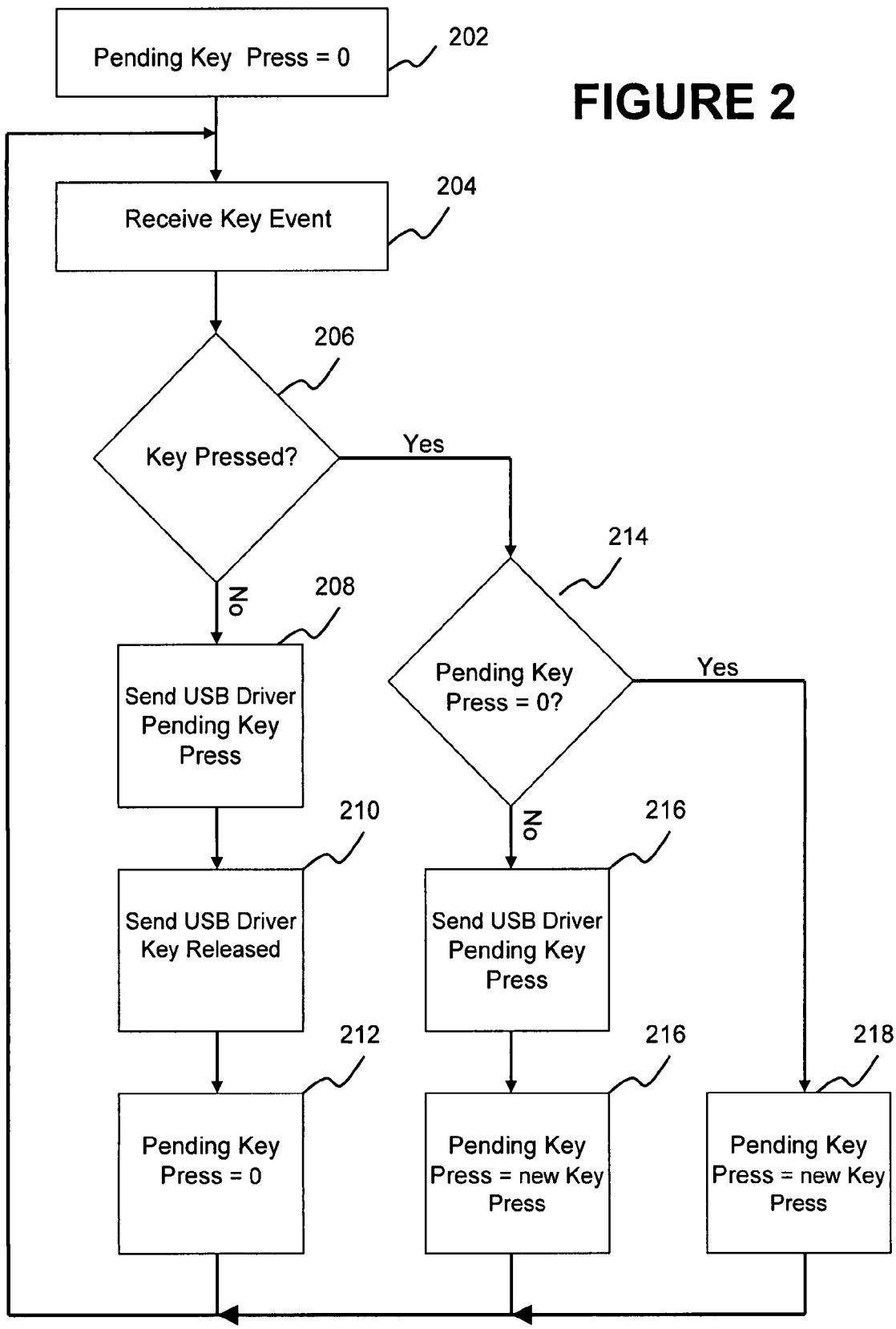
FIG. 2 shows a flowchart describing the processing of keystroke events.

FIG. 2 is one embodiment of the steps described above in a flowchart format. First, the initial state 202 of the circuitry is such that there are no key press events pending. Once the circuitry receives a key event 204 the circuitry determines whether or not a key is pressed 206. If the answer is no, the circuitry sends the USB driver a Pending Key Press command 208, and then sends the USB driver a Key Released command 210. The circuitry then resorts to its initial status 212 and waits for the next received key event.

On the other hand, if the circuitry determines that a key is pressed 206, then the circuitry determines 214 if the key pressed is the initial pressing of a key, or if it is a pending key. If the circuitry determines that there is a pending key press then the circuitry sends the USB driver a Pending Key Press command 216, (for that prior key press), and then marks the current key press event as a new key press event 218. Should the circuitry determine 214 that there are no pending key press events, the circuitry marks the current key press event as a new key press event 220. Thus, by eliminating the time lapse between key pressed and key released events, the present invention processes key strokes in a manner that eliminates delay in the target computer and reduces the erroneous output of multiple key strokes.

In an alternate embodiment of the invention, should a user hold down a key for a prolonged period of time, the invention allows the USB protocol to issue commands enabling the processing of the key on a continuous basis until the user releases the key, whereupon a Key Released command is issued.

In yet another embodiment, modifier keys (such as the Alt key, Shift key, and Ctrl key, etc.) are unaffected by the present invention and are processed normally. This addresses the need to correctly process mouse clicks with modifier keys (e.g., shift-click or ctrl-click events).

While the invention has been described in connection with what is presently considered to be the preferred embodiment, it is to be understood that the invention is not to be limited to the disclosed embodiment, but on the contrary, is intended to cover various modifications and equivalent arrangements included within the spirit and scope of the appended claims.

What is claimed:

1. A method of preventing multiple keystroke entries from being displayed on a target computer, wherein a virtual Universal Serial Bus (USB) keyboard is connected to said target computer in a network system, the method comprising the steps of:
   receiving an indication of a key depressed by a user on said USB keyboard;
   delaying processing of said depressed key until another event is received;
   receiving a next event and determining whether said received event is a key press event or a key released event; and
   processing said depressed key to display a single keystroke on the target computer.

2. The method of claim 1, wherein said received event is a key released event, further comprising the steps of:
   processing a pending key press event; and
   processing the key released event.

3. The method of claim 1, wherein said received event is determined to be a key press event, further comprising the steps of:
   processing a pending key press event if one exists; and
   marking the current key press event as a pending key event.

4. The method of claim 1, wherein the method is performed in a server.

5. The method of claim 4, wherein the server is a blade-based server.

6. The method of claim 1, wherein the method is performed in a rack interface pod.

7. The method of claim 1, wherein if a key is depressed continuously, the key is processed until a key released event is received.

8. The method of claim 1, wherein if a modifier key is depressed, the modifier key is not delayed in processing.

9. A rack interface pod comprising:
   (A) a housing;
   (B) a Universal Serial Bus (USB) connection; and
   (C) circuitry constructed and adapted to:
      (a) receive a keystroke press event from a remote computer connected to the network;
      (b) delay processing of said depressed key until another event is received by said circuitry;
      (c) determine whether said received event is a key press event or a key released event; and
      (d) process key released events for display of a single keystroke on said target computer.

10. The rack interface pod of claim 9, wherein if said circuitry first determines said received event is a key released event, said circuitry is further constructed and adapted to:
   (A) first process a pending key press event; and
   (B) secondly process the key released event.

11. The rack interface pod of claim 9, wherein if said circuitry first determines said received event is a key press event, said circuitry is further constructed and adapted to:
   (A) first process a pending key event if one exists; and
   (B) mark the current key press event as a pending key event.

12. The rack interface pod of claim 9, wherein if a key is depressed continuously, said circuitry is further constructed and adapted to process the key until a key released event is received.

13. The rack interface pod of claim 9, wherein if a modifier key is depressed, said circuitry is further constructed and adapted to not delay in processing said modifier key.

14. A server comprising:
   (A) a housing;
   (B) a Universal Serial Bus (USB) connection; and
   (C) circuitry constructed and adapted to:
      (a) receive a keystroke press event from a remote computer connected to the network;
      (b) delay processing of said depressed key until another event is received by said circuitry;
      (c) determine whether said received event is a key press event or a key released event; and
      (d) process key released events for display of a single keystroke on said target computer.

15. The server of claim 14, wherein if said circuitry first determines said received event is a key released event, said circuitry is further constructed and adapted to:
   (A) first process a pending key press event; and
   (B) secondly process the key released event.

16. The server of claim 14, wherein if said circuitry first determines said received event is a key press event, said circuitry is further constructed and adapted to:
 (A) first process a pending key event if one exists; and
 (B) mark the current key press event as a pending key event.

17. The server of claim 14, wherein if a key is depressed continuously, said circuitry is further constructed and adapted to process the key until a key released event is received.

18. The server of claim 14, wherein if a modifier key is depressed, said circuitry is further constructed and adapted to not delay in processing said modifier key.

19. The server of claim 14, wherein the server is a blade-based server.

* * * * *